United States Patent
Okamura

(10) Patent No.: US 10,512,842 B2
(45) Date of Patent: Dec. 24, 2019

(54) STORAGE MEDIUM, GAME DEVICE, AND GAME PROCESSING METHOD

(71) Applicant: NINTENDO CO., LTD., Kyoto-shi, Kyoto (JP)

(72) Inventor: Yuichiro Okamura, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 37 days.

(21) Appl. No.: 15/673,680

(22) Filed: Aug. 10, 2017

(65) Prior Publication Data
US 2019/0046880 A1 Feb. 14, 2019

(51) Int. Cl.
*A63F 13/493* (2014.01)
*A63F 13/95* (2014.01)
*G06F 12/08* (2016.01)

(52) U.S. Cl.
CPC ............ *A63F 13/493* (2014.09); *A63F 13/95* (2014.09); *G06F 12/08* (2013.01); *G06F 2212/507* (2013.01)

(58) Field of Classification Search
CPC ......... A63F 13/493; A63F 13/95; G06F 12/08
See application file for complete search history.

(56) References Cited

U.S. PATENT DOCUMENTS

| 2004/0204228 A1* | 10/2004 | Walker | G07F 17/3244 463/20 |
| 2013/0172086 A1* | 7/2013 | Ikenaga | A63F 13/10 463/43 |
| 2015/0052268 A1* | 2/2015 | Brown | G06F 3/0656 710/23 |
| 2015/0126282 A1* | 5/2015 | Hitomi | A63F 13/355 463/42 |

* cited by examiner

*Primary Examiner* — James S. McClellan
*Assistant Examiner* — Peter J Iannuzzi
(74) *Attorney, Agent, or Firm* — Nixon & Vanderhye P.C.

(57) ABSTRACT

A storage medium according to a first aspect of the present invention is a non-transitory storage medium storing therein a game program that is readable by a computer in an information processing device. The game program causes the computer to execute: a game processing step of performing game processing, based on an operation by a player; a first event processing step of reproducing a predetermined event scene every timing at which a predetermined condition is satisfied during progress of a game; a memory monitoring step of monitoring a usage state of a memory during the progress of the game; and a second event processing step of, when an area available in the memory is insufficient, performing processing of reproducing the event scene and allocating an area available in the memory.

21 Claims, 13 Drawing Sheets

OBJECT 1

OBJECT 2

OBJECT 3

OBJECT 4

STORAGE MEDIUM, GAME DEVICE, AND GAME PROCESSING METHOD

FIELD OF INVENTION

The present invention relates to a storage medium, a game device, and a game processing method.

BACKGROUND

With regard to various game devices, when a player plays a game, an area available in a memory becomes insufficient with the progress of the game, which may hinder the progress of the game. For example, when too many objects appear on a game screen or when areas available in a memory are fragmented, required data cannot be stored in the memory, so that the game cannot be played continuously. If such a situation occurs, typically, the in-progress game is temporarily suspended, and then data in the memory is provisionally deleted.

SUMMARY of INVENTION

However, if the game is temporarily suspended due to the insufficient memory, the player may feel strange since the game is suddenly suspended irrespective of the progress of the game.

In view of the circumstance described above, the present invention provides a storage medium, a game device, and a game processing method each capable of causing a player to be less likely to feel strange even when an area available in a memory becomes insufficient with progress of a game and the game is temporarily suspended for allocating an area available in the memory.

A storage medium according to a first aspect of the present invention is a non-transitory storage medium storing therein a game program that is readable by a computer in an information processing device with at least one memory, the game program causing the computer to execute: a game processing step of performing game processing, based on an operation by a player; a first event processing step of reproducing a predetermined event scene every timing at which a predetermined condition is satisfied during progress of a game; a memory monitoring step of monitoring a usage state of the memory during the progress of the game; and a second event processing step of, when an area available in the memory is insufficient, performing processing of reproducing the event scene and allocating an area available in the memory.

According to this configuration, the first event processing step of reproducing the event scene is performed every timing at which a predetermined condition is satisfied during the game processing. The event scene is repeatedly reproduced every timing at which the predetermined condition is satisfied. Therefore, the event scene makes a player understand that the event scene is reproduced concomitantly with the progress of the game.

If an area available in the memory becomes insufficient in course of the progress of the game, it is necessary to perform processing of allocating the area available in the memory. However, it is necessary to suspend the game in order to perform this processing. In view of this circumstance, the processing of reproducing the event scene and allocating the area available in the memory is performed if an area available in the memory becomes insufficient. This configuration makes the player understand that the event scene is normally reproduced even when the game is suddenly suspended and the processing of allocating an area available in the memory is performed irrespective of the progress of the game. In other words, an insufficient state of the memory is resolved without making the player feel strange because of the sudden suspension of the game.

A storage medium according to a second aspect of the present invention is the storage medium according to the first aspect, wherein the game processing involves processing of changing a status of a predetermined object in a virtual space and updating data that concerns the object and is stored in an area of the memory, based on an operation by the player, and the second event processing step includes memory initialization processing of initializing the data stored in the area of the memory, in order to allocate the area available in the memory.

According to this configuration, with the progress of the game, a status of an object is changed in the virtual space. For example, an object appears in or is erased from the virtual space. Therefore, data that concerns the object and is stored in the memory is also updated in accordance with the change in status of the object. Such game processing is prone to cause the insufficient state of the memory. Hence, the second event processing step includes the memory initialization processing of initializing the data stored in the area of the memory, in order to allocate the area available in the memory. The insufficient state of the memory is thus resolved.

A storage medium according to a third aspect of the present invention is the storage medium according to the first aspect, wherein the second event processing step includes defragmentation processing for the memory, in order to allocate the area available in the memory.

Various methods are considered for allocating an area available in the memory. For example, the defragmentation processing may be performed on the memory. Fragmented areas available in the memory are thus merged into one. As a result, data having a larger size is stored in the memory.

A storage medium according to a fourth aspect of the present invention is the storage medium according to the second aspect, wherein the game processing involves processing of erasing at least some of objects in the virtual space, based on an operation by the player, and the first event processing step and the second event processing step are set to further reproduce the event scene and to cause at least some of the erased objects to appear again in the virtual space.

According to this configuration, the normal game processing involves erasing objects. Therefore, the processing of reproducing the event scene and causing the erased objects to appear again in the virtual space makes the player to understand that the reproduction of the event scene is processing required for progress of a game. Accordingly, this configuration makes the player accept the reproduction of the event scene in the second event processing step without strange feeling.

A storage medium according to a fifth aspect of the present invention is the storage medium according to the first aspect, wherein in the first event processing step, the event scene is reproduced every lapse of a predetermined time in terms of an in-game time.

The timing of reproducing the event scene is not particularly limited. For example, the event scene may be reproduced every lapse of a predetermined time in terms of an in-game time. According to this configuration, the event scene is repeatedly reproduced every predetermined time. Therefore, this configuration makes the player accept the reproduction of the event scene in the second event processing step without strange feeling.

A storage medium according to a sixth aspect of the present invention is the storage medium according to the first aspect, wherein in the second event processing step, the area available in the memory is allocated in reproducing at least a part of the event scene.

The area available in the memory may be allocated after the reproduction of the event scene or in reproducing at least a part of the event scene. In particular, when the area available in the memory is allocated in reproducing the event scene, there is no necessity to additionally set a time for the allocation processing. This configuration makes the player to be less likely to feel strange.

A storage medium according to a seventh aspect of the present invention is the storage medium according to the first aspect, wherein the area available in the memory is allocated every timing at which predetermined game suspension processing is performed.

According to this configuration, the area available in the memory is allocated not only when the area available in the memory becomes insufficient, but also every timing at which the predetermined game suspension processing is performed. In other words, processing of allocating an area available in the memory is performed even when the memory is not brought into a state in which an available area is insufficient. As a result, the memory is prevented from being brought into the state in which an available area is insufficient. The predetermined game suspension processing may be performed, for example, when a scene of the game is changed by high-speed movement of an object as a main character to a remote place.

A game device according to an eighth aspect of the present invention is a game device including: at least one processor; at least one memory; and a non-transitory storage medium that stores therein at least one game program, wherein the game program causes the processor to execute: a game processing step of performing game processing, based on an operation by a player; a first event processing step of reproducing a predetermined event scene every timing at which a predetermined condition is satisfied during progress of a game; a memory monitoring step of monitoring a usage state of the memory during the progress of the game; and a second event processing step of, when an area available in the memory is insufficient, performing processing of reproducing the event scene and allocating an area available in the memory.

A game device according to a ninth aspect of the present invention is the game device according to the eighth aspect, wherein the game processing involves processing of changing a status of a predetermined object in a virtual space and updating data that concerns the object and is stored in an area of the memory, based on an operation by the player, and the second event processing step includes memory initialization processing of initializing the data stored in the area of the memory, in order to allocate the area available in the memory.

A game device according to a tenth aspect of the present invention is the game device according to the eighth aspect, wherein the second event processing step includes defragmentation processing for the memory, in order to allocate the area available in the memory.

A game device according to an eleventh aspect of the present invention is the game device according to the ninth aspect, wherein the game processing involves processing of erasing at least some of objects in the virtual space, based on an operation by the player, and the first event processing step and the second event processing step are set to further reproduce the event scene and to cause at least some of the erased objects to appear again in the virtual space.

A game device according to a twelfth aspect of the present invention is the game device according to the eighth aspect, wherein in the first event processing step, the event scene is reproduced every lapse of a predetermined time in terms of an in-game time.

A game device according to a thirteenth aspect of the present invention is the game device according to the eighth aspect, wherein in the second event processing step, the area available in the memory is allocated in reproducing at least a part of the event scene.

A game device according to a fourteenth aspect of the present invention is the game device according to the eighth aspect, wherein the area available in the memory is allocated every timing at which predetermined game suspension processing is performed.

A game processing method according to a fifteenth aspect of the present invention is a game processing method to be carried out in an information processing device with at least one memory, the game processing method including: a game processing step of performing game processing, based on an operation by a player; a first event processing step of reproducing a predetermined event scene every timing at which a predetermined condition is satisfied during progress of a game; a memory monitoring step of monitoring a usage state of the memory during the progress of the game; and a second event processing step of, when an area available in the memory is insufficient, performing processing of reproducing the event scene and allocating an area available in the memory.

A game processing method according to a sixteenth aspect of the present invention is the game processing method according to the fifteenth aspect, wherein the game processing involves processing of changing a status of a predetermined object in a virtual space and updating data that concerns the object and is stored in an area of the memory, based on an operation by the player, and the second event processing step includes memory initialization processing of initializing the data stored in the area of the memory, in order to allocate the area available in the memory.

A game processing method according to a seventeenth aspect of the present invention is the game processing method according to the fifteenth aspect, wherein the second event processing step includes defragmentation processing for the memory, in order to allocate the area available in the memory.

A game processing method according to an eighteenth aspect of the present invention is the game processing method according to the sixteenth aspect, wherein the game processing involves processing of erasing at least some of objects in the virtual space, based on an operation by the player, and the first event processing step and the second event processing step are set to further reproduce the event scene and to cause at least some of the erased objects to appear again in the virtual space.

A game processing method according to a nineteenth aspect of the present invention is the game processing method according to the fifteenth aspect, wherein in the first event processing step, the event scene is reproduced every lapse of a predetermined time in terms of an in-game time.

A game processing method according to a twentieth aspect of the present invention is the game processing method according to the fifteenth aspect, wherein in the second event processing step, the area available in the memory is allocated in reproducing at least a part of the event scene.

A game processing method according to a twenty-first aspect of the present invention is the game processing method according to the fifteenth aspect, wherein the area available in the memory is allocated every timing at which predetermined game suspension processing is performed.

DETAILED DESCRIPTION OF THE PREFERRED EMBODIMENTS

A storage medium that stores a game program therein, a game device, and a game processing method according to an embodiment of the present invention will be described below with reference to the drawings. In the following, the game device will be schematically described first, and then the game program and the game processing method will be described.

1. Game Device 1-1. Appearance of Game Device

Figure 1:
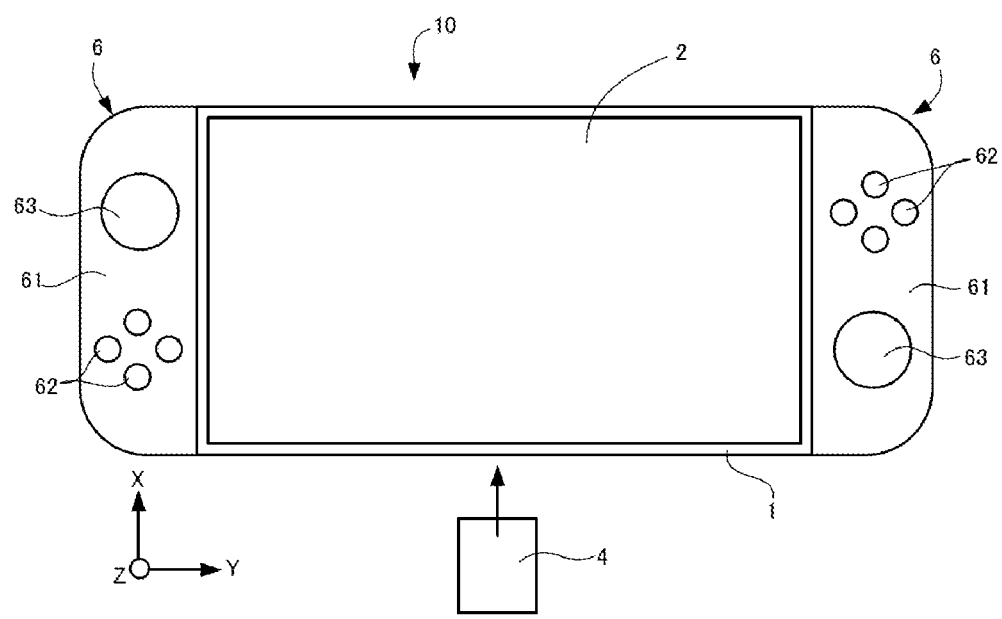
FIG. 1 is a perspective view that illustrates an appearance of a game device according to an embodiment of the present invention.

With reference to FIG. 1, first, a description will be given of an appearance of the game device. FIG. 1 is a perspective view that illustrates the appearance of the game device. As illustrated in FIG. 1, the game device 10 includes a casing 1 formed in a rectangular flat shape as seen in plan view. The casing 1 has a main surface on which a liquid crystal display (LCD) 2 is almost entirely disposed. The LCD 2 is formed in a rectangular shape. The LCD 2 has a surface on which a touch panel 3 is almost entirely disposed. The touch panel 3 is almost identical in shape to the LCD 2. The touch panel 3 used herein is not particularly limited, and various types of touch panels may be employed, such as an electrostatic capacity type, a resistive film type, a planar scatter detection type, and an ultrasonic type. In addition, a player may tap his/her finger on the touch panel 3 or may tap a touch pen on the touch panel 3. The touch panel 3 may also be of a single touch type or a multiple touch type.

The casing 1 has both sides to which controllers 6 are mounted respectively. Each of the controllers 6 includes a housing 61 that can be grasped with one hand and is formed in a rectangular shape as seen in plan view, a plurality of (e.g., four) operation buttons 62 that are disposed on a main surface of the housing 61, the main surface being directed on the same side as the main surface of the casing 1, and an analog stick 63 that is disposed on the main surface of the housing 61. The analog stick 63 is disposed to be tiltable to the main surface of the housing 61 and is configured to allow a player to input, for example, directions. The analog stick 63 and the plurality of operation buttons 62 enable various game operations. In the following description, means for performing the game operations, including the analog stick 63 and the plurality of operation buttons 62, but excluding the touch panel 3, will be collectively referred to as an operating means 65.

In addition, the casing 1 has an insertion slot (not illustrated) through which an external storage medium 4 is inserted, and a connector (not illustrated) that is disposed in the insertion slot and is electrically connected to the external storage medium 4 in a detachable manner. If necessary, the casing 1 may also be provided with various devices such as a camera, a speaker, and a microphone. In cases where a player performs game operations by voice, the operating means 65 may include a microphone.

1-2. Internal Configuration of Game Device

Figure 2:
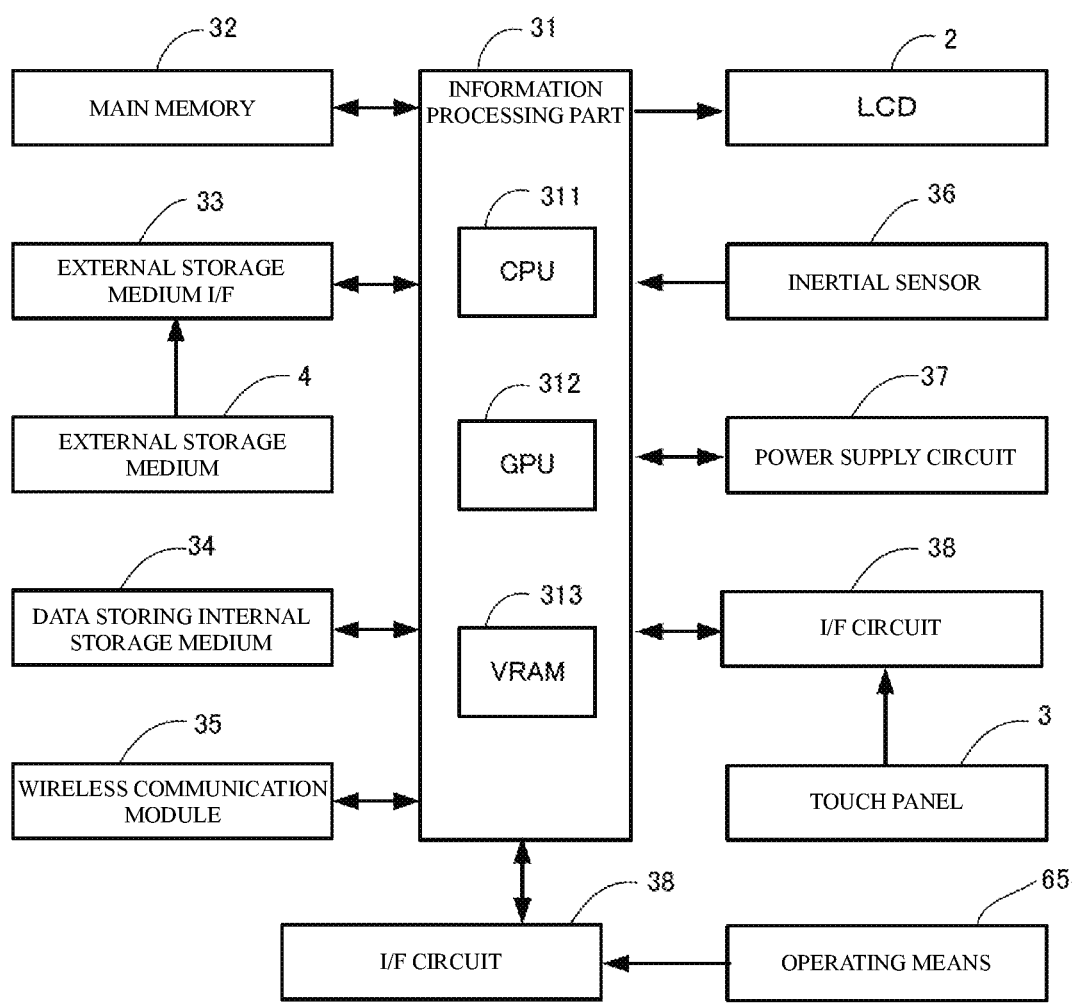
FIG. 2 is a block diagram that illustrates an internal configuration of the game device in FIG. 1.

With reference to FIG. 2, next, a description will be given of an internal configuration of the game device 10. FIG. 2 is a block diagram that illustrates the internal configuration of the game device 10. As illustrated in FIG. 2, the game device 10 includes an information processing part (control part) 31 in addition to the configuration illustrated in FIG. 1. The information processing part 31 is connected to, for example, a main memory 32, an external storage medium interface (external storage medium I/F) 33, a data storing internal storage medium 34, a wireless communication module (communication part) 35, an inertial sensor 36, a power supply circuit 37, and a plurality of interface circuits (I/F circuits) 38. These electronic components are mounted on an electronic circuit board and are accommodated in the casing 1. The information processing part 31 is also connected to the LCD 2.

The information processing part 31 includes, for example, a central processing unit (CPU) 311 for executing a predetermined program, a graphics processing unit (GPU) 312 for performing image processing, and a video random access memory (VRAM) 313. In this embodiment, the predetermined program is stored in a memory (e.g., the external storage medium 4 connected to the external storage medium I/F 33, the data storing internal storage medium 34) in the game device 10. The CPU 311 of the information processing part 31 executes the predetermined program, thereby performing game processing (to be described later) and various kinds of processing based on the game processing.

In the information processing part 31, the GPU 312 generates an image in accordance with a command from the CPU 311 and draws the image on the VRAM 313. The GPU 312 then outputs the image drawn on the VRAM 313 to the LCD 2 connected to the information processing part 31. The image is thus displayed on the LCD 2.

The main memory 32 is a volatile storage means to be used as a work region and a buffer region for the CPU 311. In other words, the main memory 32 temporarily stores therein various kinds of data for use in the processing described above and temporarily stores therein programs to be acquired from the outside (e.g., the external storage medium 4, another equipment).

The external storage medium I/F 33 is an interface to which the external storage medium 4 is detachably connected. The external storage medium 4 is a nonvolatile storage means for storing a program to be executed by the information processing part 31. The external storage medium 4 is constituted of, for example, a read-only semiconductor memory. When the external storage medium 4 is connected to the external storage medium I/F 33, the information processing part 31 reads a program stored in the external storage medium 4. The information processing part 31 executes the program thus read, thereby performing predetermined processing.

The data storing internal storage medium 34 is constituted of a readable and writable nonvolatile memory (e.g., a NAND flash memory) and is used for storing predetermined data. For example, the data storing internal storage medium 34 stores therein data and programs downloaded by wireless communications via the wireless communication module 35.

The wireless communication module 35 is, for example, a Wi-Fi certified communication module. The wireless communication module 35 has a function of establishing connection with a wireless local area network (LAN) by a method conforming to, for example, IEEE 802.11a/b/g/n/ac. The information processing part 31 exchanges data with another game device by use of the wireless communication module 35 or exchanges data with another equipment via the Internet, for example.

The wireless communication module 35 also has a function of establishing wireless communications among a plurality of game devices in cases where a game is played among the plurality of game devices.

The inertial sensor 36 is configured to detect angular speeds about three axes (X, Y, and Z axes in this embodiment). The inertial sensor 36 may be, for example, at least one gyro sensor or acceleration sensor. In cases of employing a gyro sensor, the inertial sensor 36 detects an angular speed about the X axis extending in a shorter side direction of the casing 1 illustrated in FIG. 1, an angular speed about the Y axis extending in a longer side direction of the casing 1, and an angular speed about the Z axis extending in a thickness direction of the casing 1 (i.e., a direction perpendicular to the main surface). The information processing part 31 receives data indicating the angular speeds detected by the inertial sensor 36, such as a gyro sensor or an acceleration sensor, to calculate amounts of tilt of the casing 1 about the X, Y, and Z axes.

The power supply circuit 37 controls electric power from a power supply (not illustrated) of the game device 10 and feeds the electric power to the respective components of the game device 10.

The game device 10 includes the plurality of I/F circuits 38 to which the touch panel 3 and the operating means 65 are connected respectively. The I/F circuit 38, to which the touch panel 3 is connected, includes a touch panel control circuit that controls the touch panel 3. The touch panel control circuit generates tapped position data in a predetermined format, based on a signal from the touch panel 3 and outputs the tapped position data to the information processing part 31. The tapped position data indicates coordinates (touch information) of an input position on an input face of the touch panel 3. The touch panel control circuit reads a signal from the touch panel 3 and generates tapped position data once a predetermined time. The information processing part 31 acquires the tapped position data to determine the input position on the touch panel 3.

The I/F circuit 38, to which the operating means 65 is connected, includes a control circuit that controls the operating means 65. The control circuit generates operation data in a predetermined format, based on a signal from the operating means 65 and outputs the operation data to the information processing part 31.

2. Management of Main Memory in Game Device

Next, a description will be given of management of the main memory 32 in playing a game using the game device 10 configured as described above.

2-1. Exemplary Data for Use in Game Processing

Figure 3:
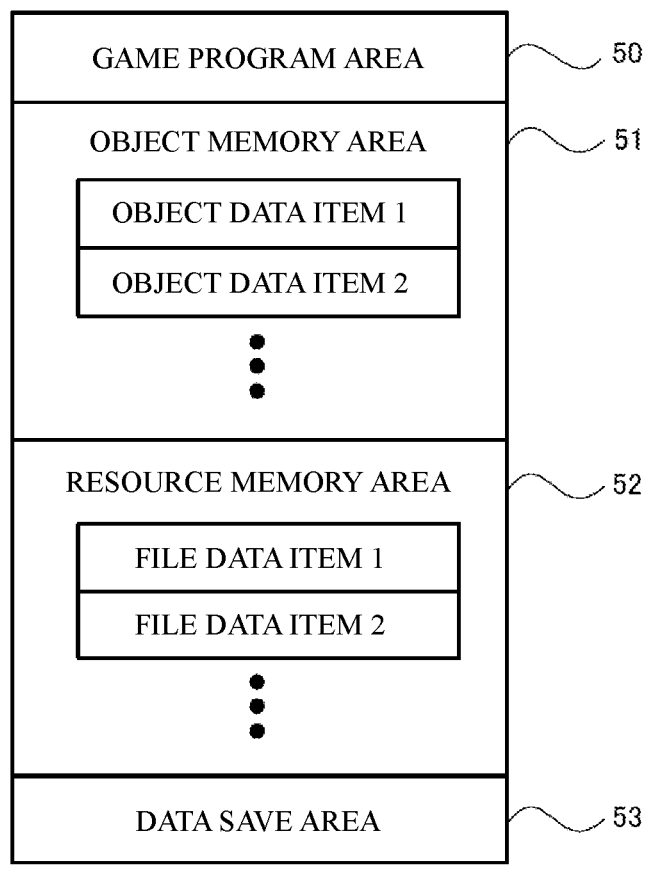
FIG. 3 illustrates various kinds of data for use in game processing.

First, a description will be given of various kinds of data for use in the game processing to be performed by the game device 10. FIG. 3 illustrates various kinds of data that are stored in the main memory 32 and are used for the game processing. As illustrated in FIG. 3, the main memory 32 of the game device 10 has a game program area 50, an object memory area 51, a resource memory area 52, and a data save area 53. A description will be given of each of the areas.

The game program area 50 stores therein a game program for progress of a game. The game program is partially or entirely read from the external storage medium 4 or the data storing internal storage medium 34 and then is stored in the main memory 32 at appropriate timing after power-on of the game device 10. A part of the game program (e.g., a program for calculating an orientation of the casing 1) may be stored in the game device 10 in advance.

The object memory area 51 stores therein data on a program required for creating various objects appearing in a game (e.g., characters such as humans, backgrounds such as mountains and rocks). Hereinafter, the data will be referred to as object data items 1, 2, 3, . . . for each object. The object memory area 51 is allocated in the main memory 32 by the game program.

The resource memory area 52 stores therein data on various files for creating objects. Hereinafter, the data will be referred to as file data items 1, 2, 3, . . . for each file. The file data items respectively indicate, for example, a shape of an object and a surface property (texture) of an object. Accordingly, in creating a plurality of objects, one file data item is commonly used for the plurality of object data items in some cases. These data items are read from the external storage medium 4 via the external storage medium I/F 33 and then are loaded onto the resource memory area 52, for example.

The data save area 53 stores therein save data indicating progress of a game. For example, if a game is suspended, referring to the save data makes it possible to restart the game by returning the progress of the game to the state before the suspension. The save data is at least partially written to the external storage medium 4 for data backup as occasion arises.

In addition, the main memory 32 stores therein data required for a game, such as operation data indicating operations to be performed on the game device 10 by a player, audio data on audio to be used for the game, and moving image data on moving images.

In this embodiment, the CPU 311 is configured to execute steps in a flowchart to be described later; however, the present invention is not limited thereto. For example, a processor or a dedicated circuit may execute some of the steps in the flowchart in place of the CPU 311.

2-2. Exemplary Use of Main Memory

Next, a description will be given of exemplary use of the main memory 32. Exemplary use of the object memory area 51 will be described first, and then exemplary use of the resource memory area 52 will be described. The description of the exemplary use of each memory area involves a case where an available area becomes insufficient.

2-2-1. Exemplary Use of Object Memory Area

Figure 4:
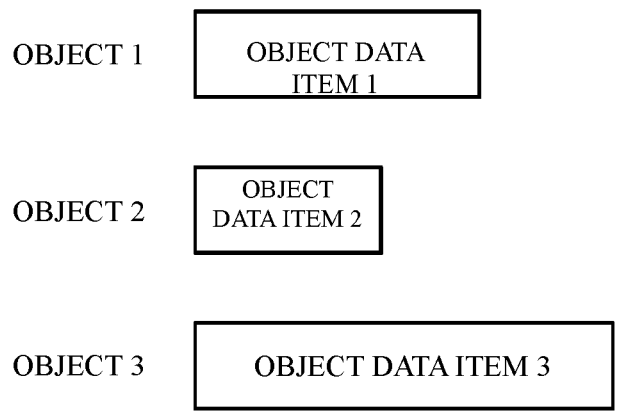
FIG. 4 illustrates exemplary object data.

A description will be given of an example that three different objects, i.e., an object 1, an object 2, and an object 3 appear in a virtual space in a game screen to be displayed on the LCD 2. In the following description, as illustrated in FIG. 4, object data items corresponding to the respective objects are referred to as an object data item 1, an object data item 2, and an object data item 3. In FIG. 4, widthwise lengths of the respective data items 1 to 3 indicate sizes of the respective data items 1 to 3, for convenience of the description. The same thing may hold true for the description of the other memory areas.

Figure 5:
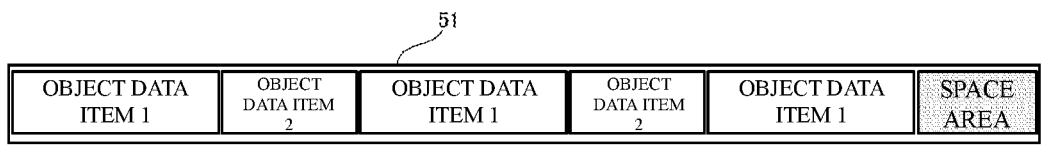
FIGS. 5 to 7 each illustrate exemplary processing for data in an object memory area.
Figure 6:
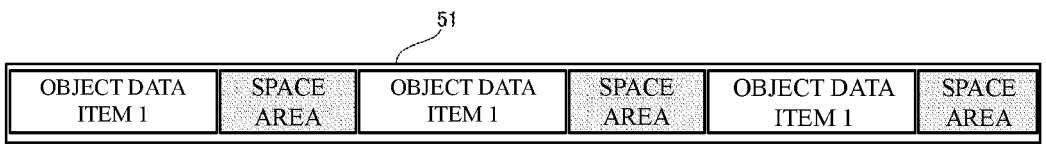

It is assumed herein that three objects 1 and two objects 2 appear in the virtual space. As illustrated in FIG. 5, for example, three object data items 1 and two object data items 2 are stored in the object memory area 51. At this time, the object memory area 51 has a space area. In this state, when the objects 2 are erased from the virtual space because the objects 2 died, for example, the two object data items 2 are deleted from the object memory area 51, so that the object memory area 51 has space areas corresponding to the two object data items 2 thus deleted. As a result, three space areas exist on the object memory area 51 as illustrated in FIG. 6. In other words, three data storable areas are fragmented.

Figure 7:
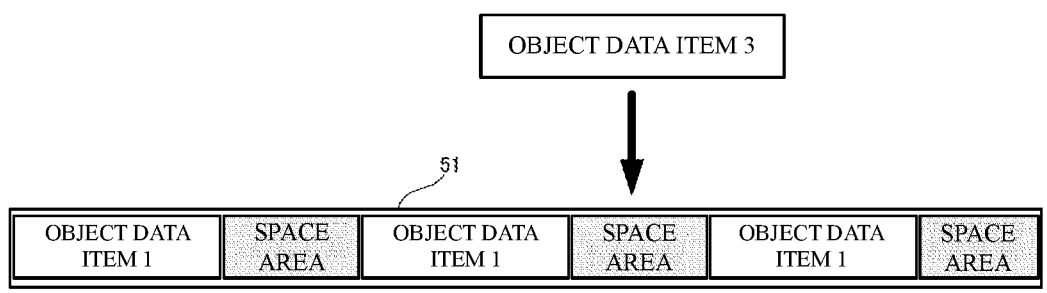

In this state, when an object 3 is planned to appear in the virtual space, the object data item 3 needs to be loaded onto a space area. If the object data item 3 has a large size, the object memory area 51 has no space area onto which the object data item 3 can be loaded, as illustrated in FIG. 7. Accordingly, an available area becomes insufficient in the object memory area 51.

2-2-2. Exemplary Use of Resource Memory Area

Figure 8:
FIG. 8 illustrates exemplary file data.
Figure 8:
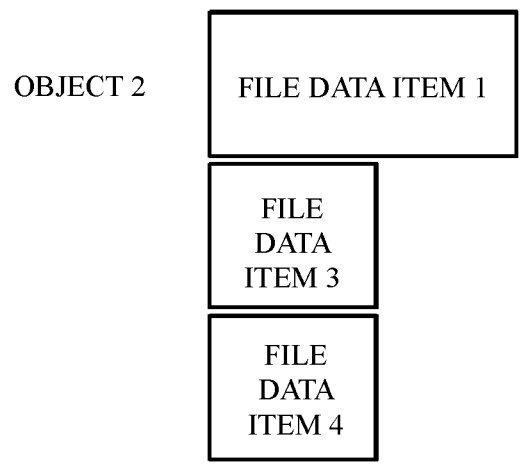
Figure 8:
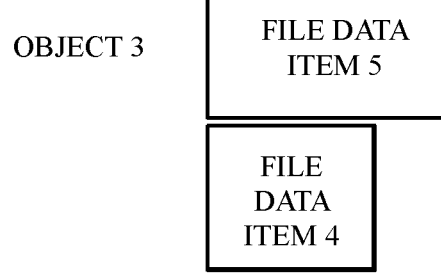
Figure 8:

A description will be given of an example that four different objects, i.e., an object 1, an object 2, an object 3, and an object 4 appear in the virtual space in the game screen. As illustrated in FIG. 8, a file data item 1 and a file data item 2 are used for the object 1. Likewise, the file data item 1, a file data item 3, and a file data item 4 are used for the object 2. The file data item 4 and a file data item 5 are used for the object 3. A file data item 6 is used for the object 4. As described above, the respective file data items are used for a plurality of objects in some cases. At this time, the number of objects is stored as a reference counter, in addition to the respective file data items. For example, when the file data item 1 is used for two objects, the number of objects "2" is stored as a reference counter (see, for example, FIG. 9).

Figure 9:
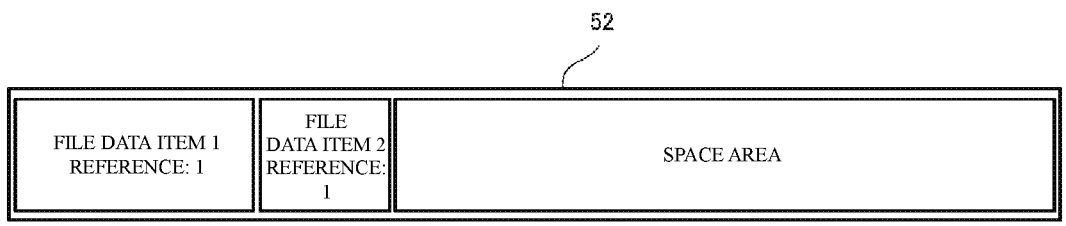
FIGS. 9 to 14 each illustrate exemplary processing for data in a resource memory area.

Next, a description will be given of exemplary use of the resource memory area 52. As illustrated in FIG. 9, when the object 1 is created, the file data item 1 and the file data item 2 are loaded onto the resource memory area 52. In this case, since the number of objects is one, reference counters (each of which is simply referred to as "reference" in the drawings) each indicate "1". At this time, the resource memory area 52 has a space area.

Figure 10:
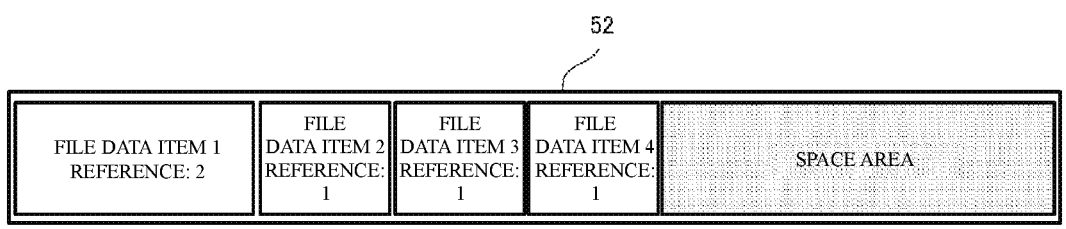

As illustrated in FIG. 10, next, when the object 2 is created, the file data item 3 and the file data item 4 are loaded onto the resource memory area 52. Since the file data item 1 to be required for the object 2 is already stored in the resource memory area 52, this file data item 1 is used for creating the object 2. However, the file data item 1 is also used for creating the object 1, the reference counter of the file data item 1 indicates "2". Since the file data item 3 and the file data item 4 are used for creating only the object 2, the reference counters of the file data item 3 and file data item 4 each indicate "1". At this time, the resource memory area 52 still has a space area.

Figure 11:
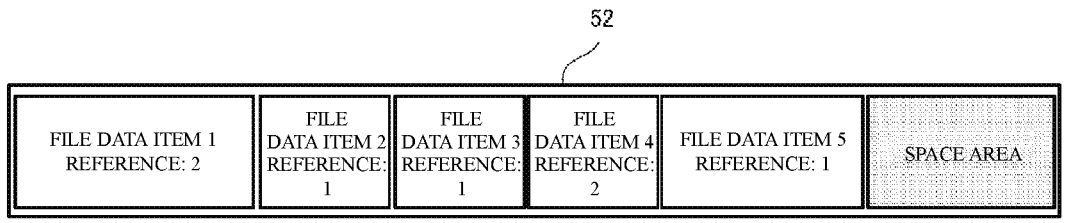

As illustrated in FIG. 11, next, when the object 3 is created, the file data item 5 is loaded onto the resource memory area 52. Since the file data item 4 to be required for creating the object 3 is already stored in the resource memory area 52, this file data item 4 is used for creating the object 3. However, the file data item 4 is also used for creating the object 2, the reference counter of the file data item 4 indicates "2". Since the file data item 5 is used for creating only the object 3, the reference counter of the file data item 5 indicates "1". At this time, the resource memory area 52 still has a space area.

Figure 12:
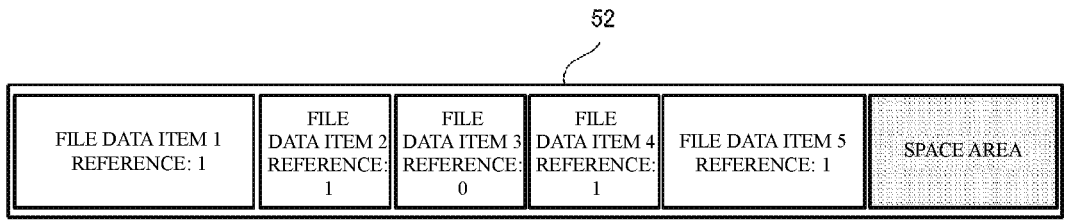

In this state, if the object 2 is erased from the virtual space because the object 2 died, for example, the reference counters of the file data items 1, 3, and 4 used for the object 2 are subtracted from the resource memory area 52 as illustrated in FIG. 12. In other words, the reference counters of the file data items 1, 3, and 4 are decremented by one to indicate "1", "0", and "1", respectively. At this time, the reference counter of the file data item 3 indicates "0", and the data item 3 is used for none of the objects. However, the file data item 3 is not deleted from the resource memory area 52. The file data item 3 is left on the resource memory area 52 in preparation for a case where the file data item 3 is required for creating the object 2 later. The file data item 3 stored as described above performs a cache function to promptly create an object using the file data item 3.

Figure 13:
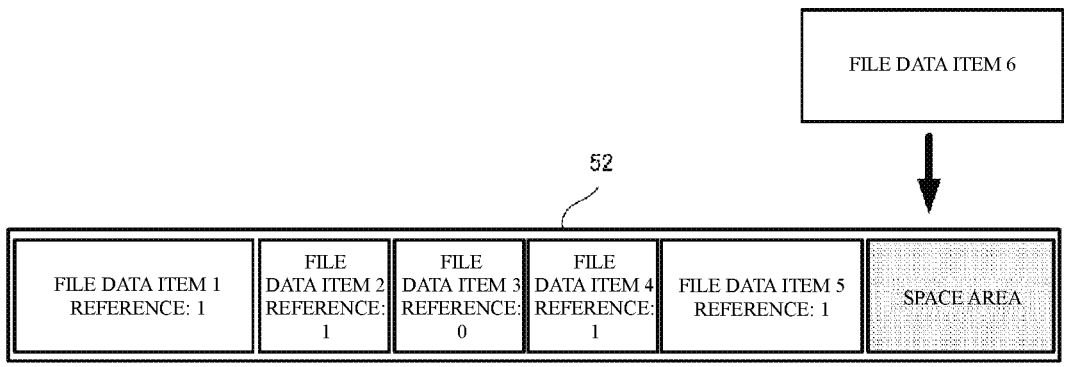
Figure 14:
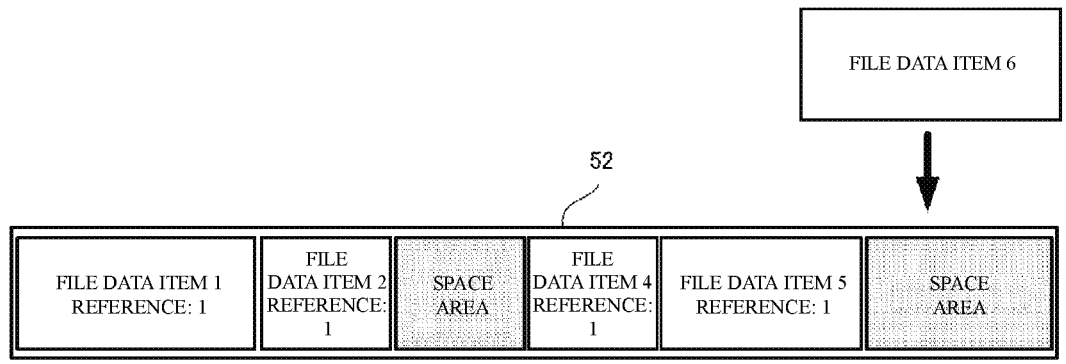

In the state illustrated in FIG. 12, next, when the object 4 is planned to appear in the virtual space, the file data item 6 needs to be loaded onto the resource memory area 52. As illustrated in FIG. 13, however, the resource memory area 52 has no space area onto which the file data item 6 can be loaded. In this case, a file data item of which the reference counter indicates "0" is deleted from the resource memory area 52. As illustrated in FIG. 14, specifically, the file data item 3 is deleted from the resource memory area 52, so that the resource memory area 52 has two fragmented space areas. However, although the fragmented space areas are allocated as described above, the resource memory area 52 still has no space area onto which the file data item 6 can be loaded. Accordingly, an available area becomes insufficient in the resource memory area 52.

2-3. Suspension Event

When an area available in each of the memory areas 51 and 52 becomes insufficient (hereinafter, such a state will be simply referred to as an "insufficient state"), it is necessary to release the memory areas. The game device 10 according to this embodiment carries out an suspension event prior to the release of the memory areas. In progress of a game, this suspension event is regularly carried out in addition to the case where the insufficient state arises. A description will be given of the suspension event.

The suspension event is carried out under two situations. First, the suspension event is carried out under a predetermined condition set in a game. Hereinafter, the suspension event to be carried out such a condition will be referred to as first event processing. With reference to a flowchart of FIG. 15, a description will be given of the first event processing. For example, the first event processing is performed under a condition that a predetermined in-game time has elapsed. The in-game time is a time that elapses with progress of a game. The in-game time is set for a game. For example, real 24 minutes may be set at 24 hours (one day) in a game. In terms of the in-game time, the first event processing may be performed every predetermined in-game time, e.g., 10 days.

Figure 15:
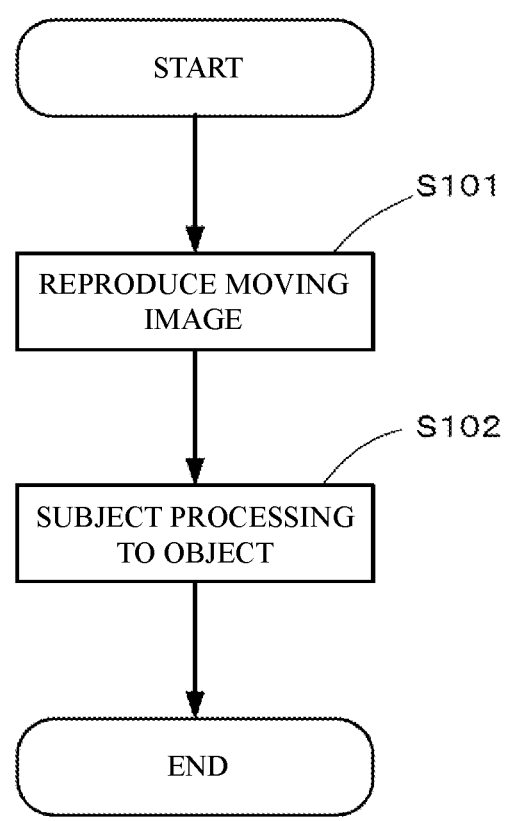
FIG. 15 is a flowchart that illustrates first event processing.

As illustrated in FIG. 15, first, the CPU 311 performs the first event processing as the suspension event to reproduce a predetermined moving image on the LCD 2 (step S101). For example, the moving image may have a bearing on progress of a game or may have no bearing on the progress of the game. In course of progress of a game, if a predetermined object is erased because of its death, the CPU 311 may reproduce a moving image of a ceremony to revive dead objects. In any case, the suspension event preferably makes a player understand that the suspension event is repeatedly carried out under the predetermined condition described above. A method of reproducing a moving image may be processing of reproducing a moving image file recorded in advance or may be processing of moving an object in a three-dimensional space as is set in advance.

After the reproduction of the moving image has been completed, the CPU 311 performs processing concerning the progress of the game. For example, the CPU 311 subjects predetermined processing to an object (step S102). The object may be subjected to various kinds of processing. In this embodiment, for example, the CPU 311 may perform processing of reviving a dead object. Specifically, the CPU 311 resets a predetermined object from a death status to a revivable status in the save data. The object thus becomes appearable in the virtual space.

2-4. Memory Area Release Processing

Next, a description will be given of memory area release processing. A description will also be given of the other situation in which the suspension event is carried out. As described above, each of the memory areas 51 and 52 may be brought into the insufficient state. In this embodiment, the CPU 311 performs second event processing when the memory areas are in the insufficient state. With reference to a flowchart of FIG. 16, a description will be given of the second event processing.

For example, the following cases may be considered as the state in which an available area in each memory area becomes insufficient.

(1) The case where the capacity of the object memory area 51 exceeds a predetermined value (e.g., 95% or more).

(2) The case where data cannot be loaded on the object memory area 51.

(3) The case where the capacity of the resource memory area 52 exceeds a predetermined value (e.g., 95% or more).

(4) The case where data cannot be loaded on the resource memory area 52.

The conditions described above are referred to as memory insufficient conditions. However, these conditions are merely examples, and various settings may be made as the memory insufficient conditions.

Figure 16:
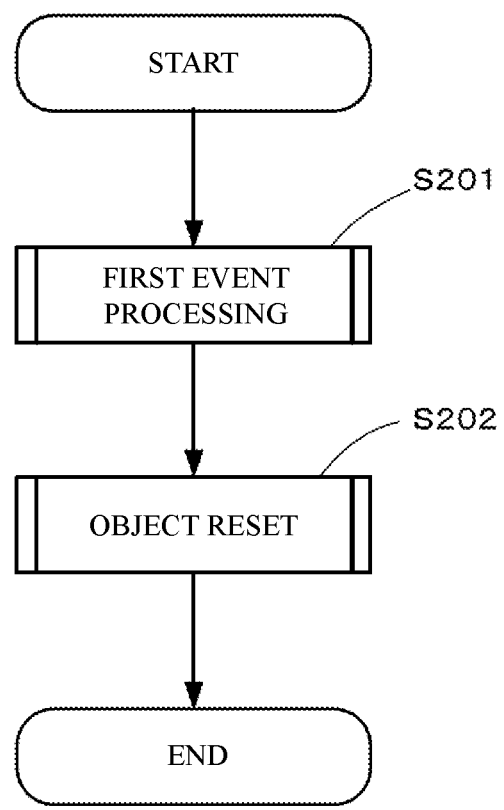
FIG. 16 is a flowchart that illustrates second event processing.

As illustrated in FIG. 16, in the second event processing, the CPU 311 performs the first event processing including the suspension event (step S201), and then performs the memory area release processing (hereinafter, referred to as "object reset") (step S202).

Figure 17:
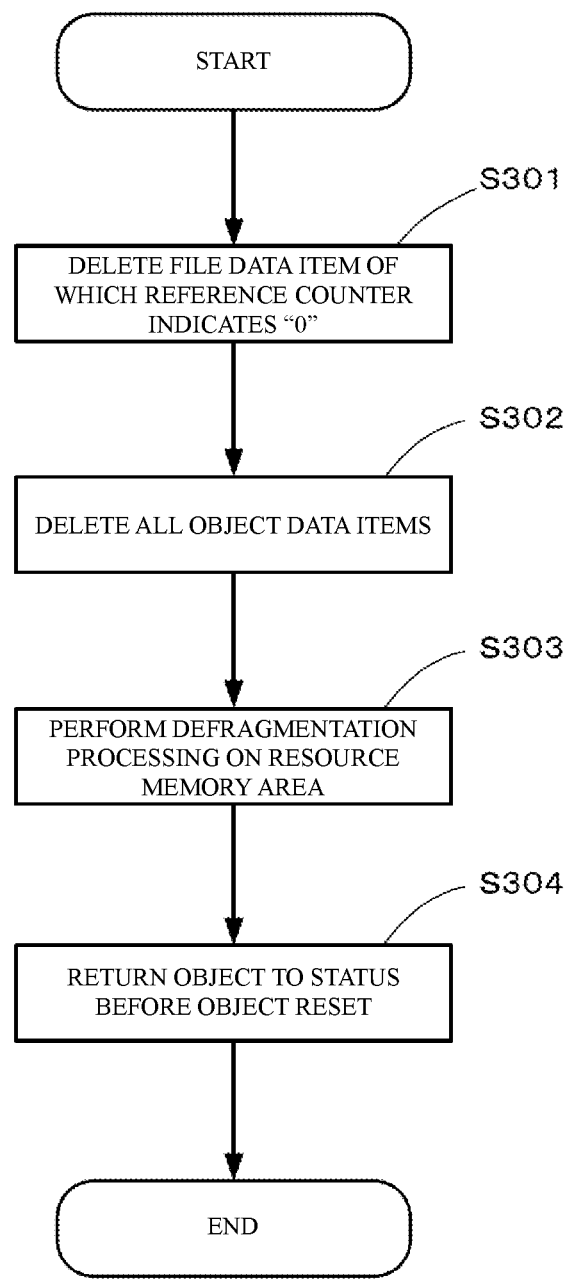
FIG. 17 is a flowchart that illustrates object reset.

With reference to FIGS. 17 to 22, a description will be given of the object reset. FIG. 17 is a flowchart that illustrates the object reset. FIGS. 18 to 22 each illustrate release processing for the resource memory area 52.

Figure 18:
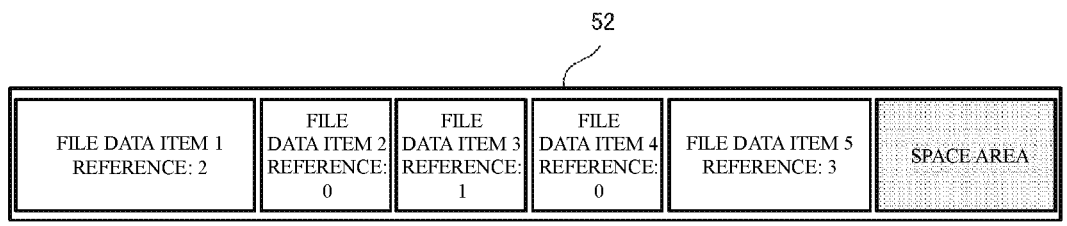
FIGS. 18 to 22 each illustrate exemplary processing for data in the resource memory area in performing the object reset.
Figure 19:
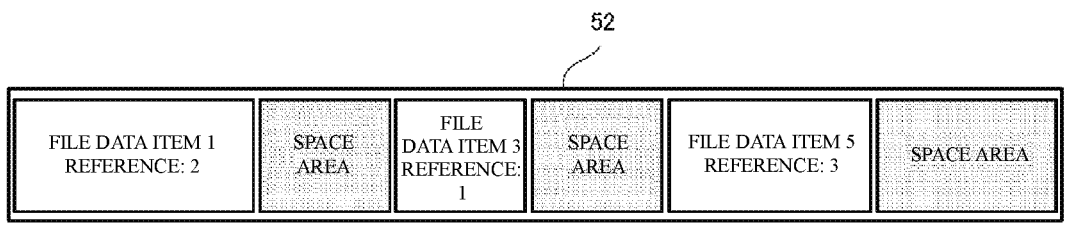
Figure 20:
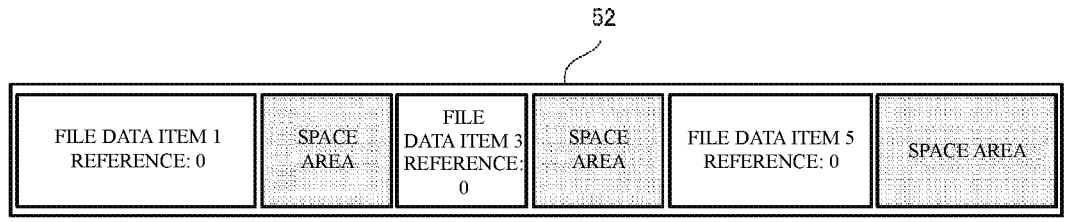

During the object reset, a suspension screen is displayed on the LCD 2. For example, a predetermined moving image, a static image, or an image of an object subjected to animation processing is displayed as the suspension screen. The object reset is performed concurrently with the display of the suspension screen. FIG. 18 schematically illustrates a state of the resource memory area 52 immediately before the second event processing. In this state, for example, the resource memory area 52 stores therein five file data items 1 to 5 of which the reference counters indicate "2", "0", "1", "0", and "3", respectively. As illustrated in FIG. 17, in the object reset, the CPU 311 deletes a file data item of which the reference counter indicates "0", from the resource memory area 52 (step S301). The file data items 2 and 4 are thus deleted from the resource memory area 52 as illustrated in FIG. 19, so that the resource memory area 52 has two new space areas. Next, the CPU 311 deletes all the object data items from the object memory area 51 to release the entire object memory area 51 (step S302). In the resource memory area 52, the reference counters of all the file data items thus indicate "0" along with the deletion of the object data items as illustrated in FIG. 20.

Figure 21:
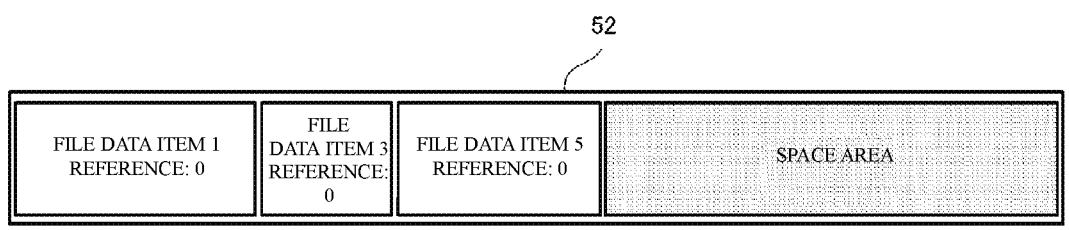
Figure 22:
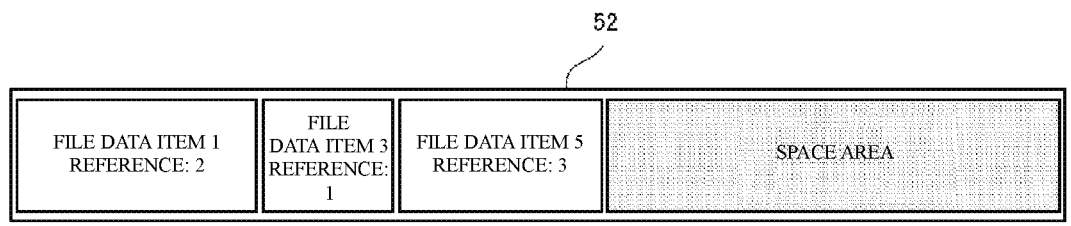

Next, the CPU 311 performs defragmentation processing on the resource memory area 52 (step S303). As illustrated in FIG. 21, specifically, the CPU 311 moves the file data items such that the resource memory area 52 has one space area. Next, the CPU 311 revives the objects, which have been displayed immediately before the second event processing, at their initial positions (step S304). Specifically, the CPU 311 refers to the save data to load onto the object memory area 51 the object data items corresponding to the objects to be revived. Moreover, the CPU 311 changes the reference counters of the file data items left on the resource memory area 52, in correspondence with the object data items. In other words, as illustrated in FIG. 22, the reference counters of the file data items left on the resource memory area 52 are set to be identical to the reference counters immediately before the second event processing illustrated in FIG. 18. The objects thus return to their initial statuses before the second event processing.

The object reset is performed when each of the memory areas 51 and 52 is brought into the insufficient state. In this embodiment, the object reset may be performed in the following cases. For example, the object reset may be performed when an object which is a main character gets in or out of a dungeon, when an object which is a main character moves (e.g., teleports) to another place, when a game is over, or when saved data is to be loaded. The object reset is performed concurrently with the display of the suspension screen as described above. Therefore, the player does not feel strange even when the object reset is performed upon change of the screen because of, for example, teleportation. In addition to the memory insufficient state, the condition under which the object reset is performed is referred to as a reset condition.

3. Game Processing

Figure 23:
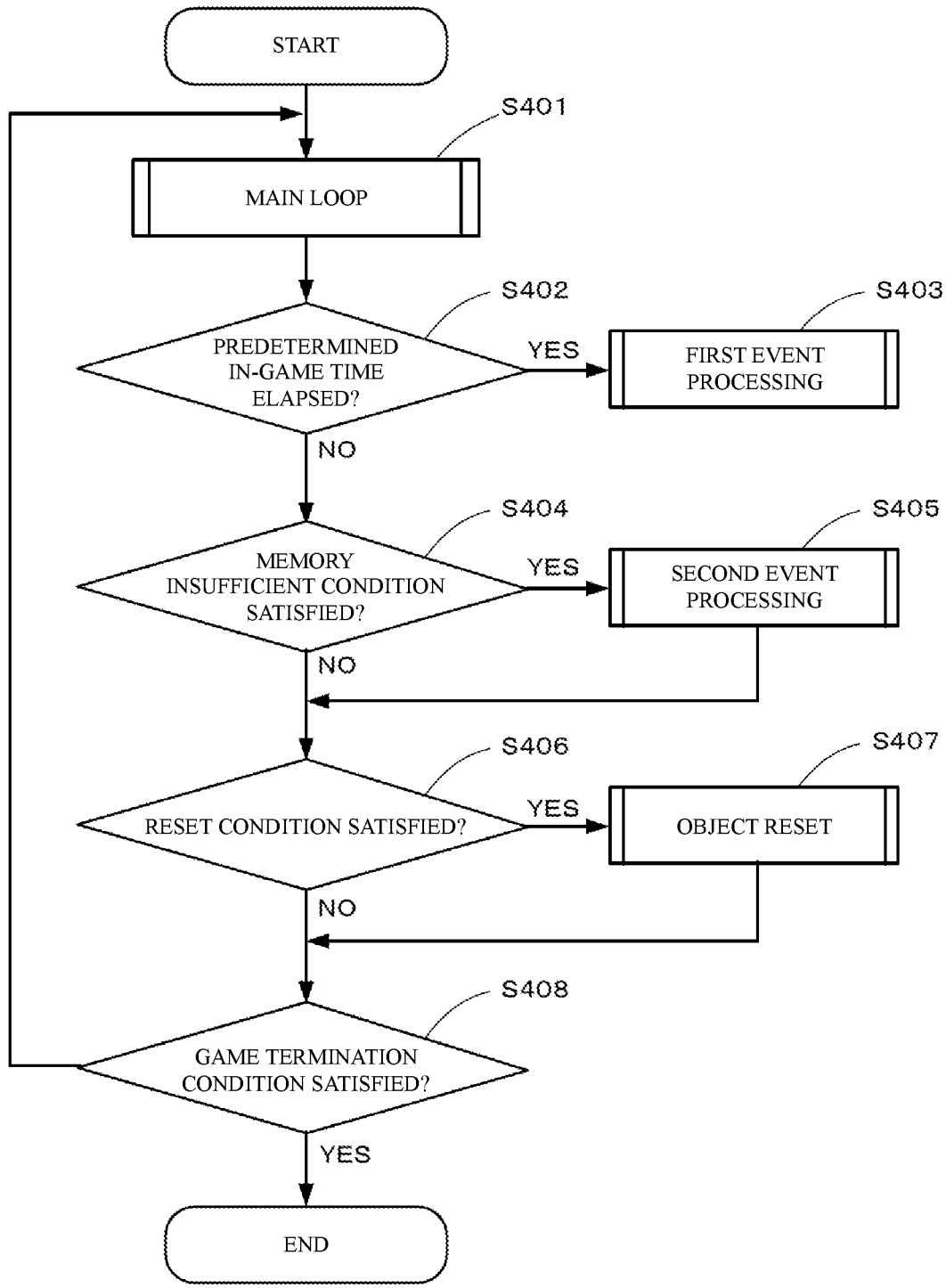
FIG. 23 is a flowchart that illustrates the game processing.

With reference to FIG. 23, next, a description will be given of the game processing. FIG. 23 is a flowchart that illustrates progress of a game.

In the game processing according to this embodiment, as illustrated in FIG. 23, the CPU 311 executes a game program to start a main loop (step S401). In other words, the CPU 311 normally starts progress of a game. When a predetermined in-game time has elapsed (YES in step S402), the CPU 311 performs the first event processing (step S403). When the predetermined in-game time has not elapsed yet (NO in step S402) and when a memory insufficient condition is satisfied (YES in step S404), the CPU 311 performs the second event processing (step S405). Next, when a reset condition is satisfied (YES in step S406), the CPU 311 performs the object reset (step S407). Next, when a predetermined game termination condition is satisfied (YES in step S408), the CPU 311 terminates the game. When no game termination condition is satisfied (NO in step S408), the CPU 311 continues the progress of the game in the main loop (step S401).

4. Features

According to this embodiment, as described above, the first event processing including the suspension event to reproduce a moving image is performed every predetermined in-game time in course of progress of a game. The suspension event is repeatedly carried out every predetermined in-game time. Therefore, the suspension event makes a player understand that the suspension event is carried out concomitantly with the progress of the game.

If an area available in each of the memory areas 51 and 52 becomes insufficient, it is necessary to release the memory areas. However, it is necessary to suspend the game in order to release the memory areas. In view of this circumstance, according to this embodiment, if each of the memory areas 51 and 52 is brought into the insufficient state, the first event processing including the suspension event is performed, and then the object reset is performed to release the memory areas. In other words, the object data is loaded again onto the object memory area 51 with the object memory area 51 released entirely, and the defragmentation processing is performed on the resource memory area 52. Even when the suspension event is carried out owing to the insufficient memory irrespective of the progress of the game, this configuration makes a player understand that this suspension event is carried out as a normal suspension event in the first event processing. Accordingly, the insufficient state of each of the memory areas 51 and 52 is resolved without making a player feel strange because of sudden suspension of a game.

In addition to the case where the available area becomes insufficient, the object reset is also performed when a reset condition is satisfied, for example, when an object which is a main character gets in or out of a dungeon. In other words, the object reset is also performed when data is to be loaded. Accordingly, the object reset which is performed although each of the memory areas 51 and 52 is not brought into the insufficient state prevents the memory areas 51 and 52 from being brought into the insufficient state.

5. Modifications

The above description is about an embodiment of the present invention. However, the present invention is not limited to the foregoing embodiment. It is to be understood by a person skilled in the art that various modifications and variations may be made without departing from the scope and spirit of the present invention. For example, the following modifications may be made. The following modifications may also be made in combination as appropriate.

5-1

In the foregoing embodiment, a moving image is reproduced in the suspension event of the first event processing; however, the present invention is not limited thereto. In addition to reproduction of a moving image by execution of a predetermined moving image file, for example, animation processing may be performed to impart predetermined motion to a predetermined model. Alternatively, at least one or more static images of a predetermined event scene may be displayed.

5-2

In the foregoing embodiment, the first event processing involves processing for an object, such as processing of reviving an object, in addition to the processing of reproducing a moving image; however, the present invention is not limited thereto. For example, any kind of processing may be performed in addition to the processing of reproducing a moving image. Alternatively, the first event processing may involve only the reproduction of the moving image.

5-3

In the foregoing embodiment, the second event processing involves performing the first event processing and then performing the object reset; however, the present invention is not limited thereto. As described above, various kinds of processing are considered as the first event processing to be performed in the second event processing. Therefore, the first event processing has only to involve at least reproducing, for example, a moving image.

5-4

In the foregoing embodiment, the object reset is performed when a memory insufficient condition is satisfied, and is also performed when a reset condition is satisfied; however, the present invention is not limited thereto. For example, the object reset may be performed only when a memory insufficient condition is satisfied.

5-5

The object reset is not limited to the defragmentation processing or the processing of releasing all the memory areas, but may involve various kinds of processing. In other words, the object reset is not particularly limited as long as it involves processing of freeing an area available in a memory area.

5-6

In the foregoing embodiment, a game device is exemplified; however, the present invention is not limited thereto. In other words, the present invention is not limited to a game device as long as the game program described above can be executed. The present invention is applicable to various information processing devices. Examples of such an information processing device may include: a special-purpose portable game terminal that is provided with an LCD; a mobile terminal that is provided with an LCD, such as a smartphone; a special-purpose stationary game device that is not provided with an LCD and is connectable to an external display device; and a personal computer.

The invention claimed is:

1. A non-transitory storage medium storing therein a game program that is readable by a computer in an information processing device with at least one memory,
   the game program causing the computer to execute:
   a game processing step of performing game processing, based on an operation by a player;
   a first event processing step of reproducing a predetermined event scene every timing at which a predetermined condition associated with progress of a game based on the game processing is satisfied;
   a memory monitoring step of monitoring a usage state of the memory during the progress of the game; and
   a second event processing step of, when an area available in the memory is insufficient, performing processing of reproducing the event scene and allocating an area available in the memory, wherein the second event processing step includes defragmentation processing for the memory, in order to allocate the area available in the memory.

2. The storage medium according to claim 1, wherein
   the game processing involves processing of changing a status of a predetermined object in a virtual space and updating data that concerns the object and is stored in an area of the memory, based on an operation by the player, and the second event processing step includes memory initialization processing of initializing the data stored in the area of the memory, in order to allocate the area available in the memory.

3. The storage medium according to claim 2, wherein the game processing involves processing of erasing at least some of objects in the virtual space, based on an operation by the player, and
the first event processing step and the second event processing step are set to further reproduce the event scene and to cause at least some of the erased objects to appear again in the virtual space.

4. A non-transitory storage medium storing therein a game program that is readable by a computer in an information processing device with at least one memory,
the game program causing the computer to execute:
a game processing step of performing game processing, based on an operation by a player;
a first event processing step of reproducing a predetermined event scene every timing at which a predetermined condition associated with progress of a game based on the game processing is satisfied;
a memory monitoring step of monitoring a usage state of the memory during the progress of the game; and
a second event processing step of, when an area available in the memory is insufficient, performing processing of reproducing the event scene and allocating an area available in the memory,
wherein in the first event processing step, the event scene is reproduced every lapse of a predetermined time in terms of an in-game time.

5. The storage medium according to claim 1, wherein in the second event processing step, the area available in the memory is allocated in reproducing at least a part of the event scene.

6. The storage medium according to claim 1, wherein the area available in the memory is allocated every timing at which predetermined game suspension processing is performed.

7. A game device comprising:
at least one processor;
at least one memory; and
a non-transitory storage medium that stores therein at least one game program,
wherein
the game program causes the at least one processor to execute:
a game processing step of performing game processing, based on an operation by a player;
a first event processing step of reproducing a predetermined event scene every timing at which a predetermined condition associated with progress of a game based on the game processing is satisfied;
a memory monitoring step of monitoring a usage state of the memory during the progress of the game; and
a second event processing step of, when an area available in the memory is insufficient, performing processing of reproducing the event scene and allocating an area available in the memory, wherein the second event processing step includes defragmentation processing for the memory, in order to allocate the area available in the memory.

8. The game device according to claim 7, wherein the game processing involves processing of changing a status of a predetermined object in a virtual space and updating data that concerns the object and is stored in an area of the memory, based on an operation by the player, and
the second event processing step includes memory initialization processing of initializing the data stored in the area of the memory, in order to allocate the area available in the memory.

9. The game device according to claim 8, wherein the game processing involves processing of erasing at least some of objects in the virtual space, based on an operation by the player, and
the first event processing step and the second event processing step are set to further reproduce the event scene and to cause at least some of the erased objects to appear again in the virtual space.

10. A game device comprising:
at least one processor;
at least one memory; and
a non-transitory storage medium that stores therein at least one game program,
wherein
the game program causes the at least one processor to execute:
a game processing step of performing game processing, based on an operation by a player;
a first event processing step of reproducing a predetermined event scene every timing at which a predetermined condition associated with progress of a game based on the game processing is satisfied;
a memory monitoring step of monitoring a usage state of the memory during the progress of the game; and
a second event processing step of, when an area available in the memory is insufficient, performing processing of reproducing the event scene and allocating an area available in the memory,
wherein in the first event processing step, the event scene is reproduced every lapse of a predetermined time in terms of an in-game time.

11. The game device according to claim 7, wherein in the second event processing step, the area available in the memory is allocated in reproducing at least a part of the event scene.

12. The game device according to claim 7, wherein the area available in the memory is allocated every timing at which predetermined game suspension processing is performed.

13. A game processing method to be carried out in an information processing device with at least one memory,
the game processing method comprising:
a game processing step of performing game processing, based on an operation by a player;
a first event processing step of reproducing a predetermined event scene every timing at which a predetermined condition associated with progress of a game based on the game processing is satisfied;
a memory monitoring step of monitoring a usage state of the memory during the progress of the game; and
a second event processing step of, when an area available in the memory is insufficient, performing processing of reproducing the event scene and allocating an area available in the memory, wherein the second event processing step includes defragmentation processing for the memory, in order to allocate the area available in the memory.

14. The game processing method according to claim 13, wherein
the game processing involves processing of changing a status of a predetermined object in a virtual space and updating data that concerns the object and is stored in an area of the memory, based on an operation by the player, and
the second event processing step includes memory initialization processing of initializing the data stored in the area of the memory, in order to allocate the area available in the memory.

15. The game processing method according to claim 14, wherein
the game processing involves processing of erasing at least some of objects in the virtual space, based on an operation by the player, and
the first event processing step and the second event processing step are set to further reproduce the event scene and to cause at least some of the erased objects to appear again in the virtual space.

16. A game processing method to be carried out in an information processing device with at least one memory, the game processing method comprising:
a game processing step of performing game processing, based on an operation by a player;
a first event processing step of reproducing a predetermined event scene every timing at which a predetermined condition associated with progress of a game based on the game processing is satisfied;
a memory monitoring step of monitoring a usage state of the memory during the progress of the game; and
a second event processing step of, when an area available in the memory is insufficient, performing processing of reproducing the event scene and allocating an area available in the memory,
wherein in the first event processing step, the event scene is reproduced every lapse of a predetermined time in terms of an in-game time.

17. The game processing method according to claim 13, wherein
in the second event processing step, the area available in the memory is allocated in reproducing at least a part of the event scene.

18. The game processing method according to claim 13, wherein
the area available in the memory is allocated every timing at which predetermined game suspension processing is performed.

19. A game device comprising:
memory; and
processing system, including at least one processor, coupled to the memory, the processing system configured to:
perform game processing based on operations received from an input device, the game processing comprises controlling a plurality of objects in a virtual space;
update, based on the game processing, object related data stored in a portion of the memory;
upon satisfying a predetermined condition during the game processing, suspend the game processing and display an event scene related to the performed game processing;
upon determining that the portion of the memory does not have enough space to store object related data for a new object, (1) suspend the game processing, (2) display the event scene, and (3) delete one or more object related data stored in the portion of the memory; and
after deleting the one or more object related data stored in the portion of the memory, store the object related data for the new object and resume performing the game processing comprising controlling the new object in the virtual space.

20. A game processing method to be carried out in an information processing device with at least one memory, the game processing method comprising:
performing game processing based on operations received from an input device, the game processing comprises controlling a plurality of objects in a virtual space;
updating, based on the game processing, object related data stored in a portion of the memory;
upon satisfying a predetermined condition during the game processing, suspending the game processing and display an event scene related to the performed game processing;
upon determining that the portion of the memory does not have enough space to store object related data for a new object, (1) suspending the game processing, (2) displaying the event scene, and (3) deleting one or more object related data stored in the portion of the memory; and
after deleting the one or more object related data stored in the portion of the memory, storing the object related data for the new object and resuming performance of the game processing comprising controlling the new object in the virtual space.

21. A non-transitory storage medium storing therein a game program that is readable by a computer in an information processing device with at least one memory,
the game program, when executed, causing the computer at least to:
perform game processing based on operations received from an input device, the game processing comprises controlling a plurality of objects in a virtual space;
update, based on the game processing, object related data stored in a portion of the memory;
upon satisfying a predetermined condition during the game processing, suspend the game processing and display an event scene related to the performed game processing;
upon determining that the portion of the memory does not have enough space to store object related data for a new object, (1) suspend the game processing, (2) display the event scene, and (3) delete one or more object related data stored in the portion of the memory; and
after deleting the one or more object related data stored in the portion of the memory, store the object related data for the new object and resume performing the game processing comprising controlling the new object in the virtual space.

* * * * *